United States Patent Office 3,091,940
Patented June 4, 1963

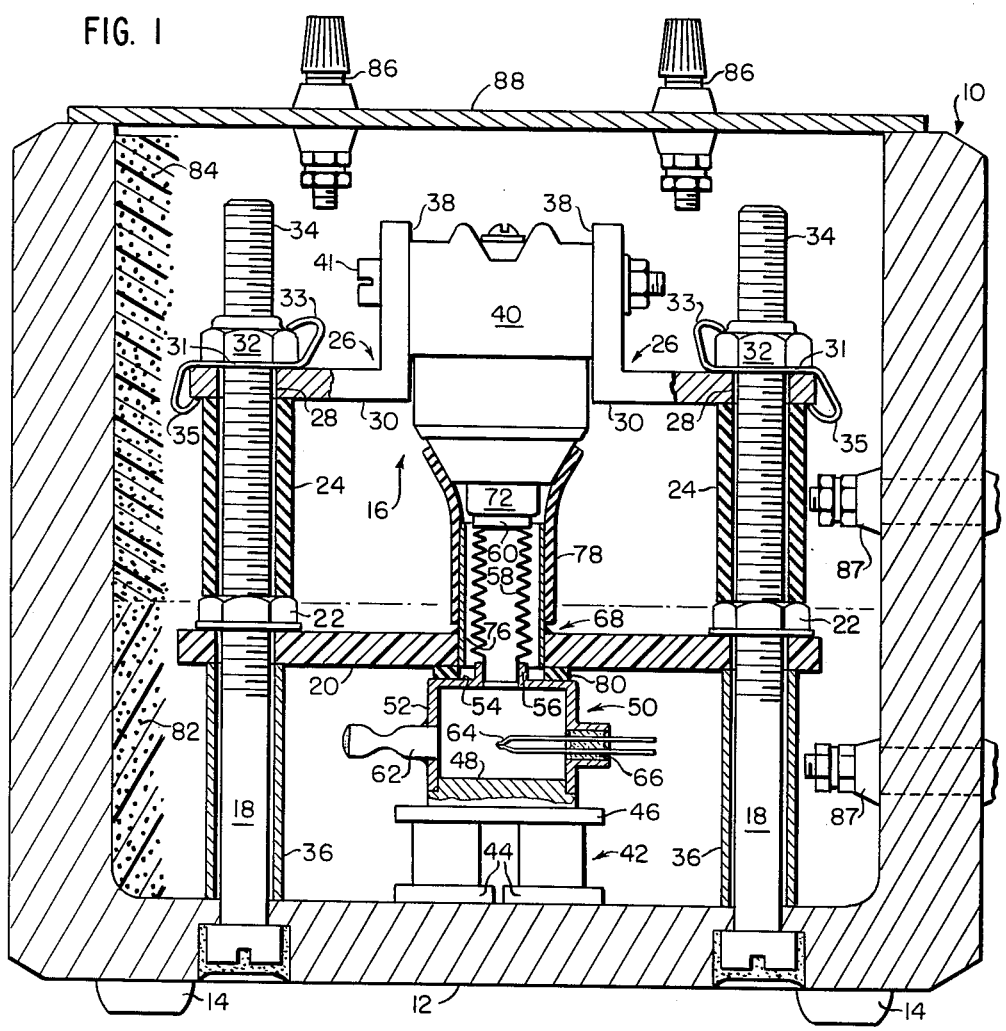

3,091,940
THERMOCOUPLE REFERENCE JUNCTION
Charles L. Feldman, Saxonville, Arnold C. Fields, Medfield, and John A. Bergin, Framingham, Mass., assignors to Joseph Kaye & Company, Inc., Cambridge, Mass., a corporation of Massachusetts
Filed Mar. 26, 1962, Ser. No. 182,312
8 Claims. (Cl. 62—3)

This invention relates generally to devices for maintaining a constant temperature, and more specifically, to devices for maintaining a thermocouple junction at a known reference temperature.

When a thermocouple is employed to make accurate temperature measurements, it is imperative that one junction of the thermocouple be maintained at a constant, known reference temperature. The reference temperature customarily employed is 0° C., the melting point of ice.

Under the teachings of the prior art, it has been common to provide an insulated container of the well-known vacuum bottle or thermos type which is filled with crushed ice and water and into which the reference junction of the thermocouple is inserted. The thermos container is placed at some convenient location, usually in the work area, and a careful watch is maintained to replenish the ice in the thermos as the ice melts. This replenishing operation requires not only substantial attention by personnel involved, but also necessarily requires the transport of ice in and about the work area to the various thermos containers thereby creating undesirable confusion and generally unfavorable working conditions.

It is, accordingly, an object of this invention to provide a device for maintaining a thermocouple reference junction at a reference temperature, which device does not require frequent attention and which can operate for substantial periods of time without consuming any of its operative components.

It is a further object of this invention to provide means for maintaining a thermocouple reference junction at 0° C. in which the reference junction is maintained at a water-ice interface and in which the water-ice interface may be adjusted, if necessary, to position it exactly at the reference junction.

It is still another object of this invention to provide means for maintaining a thermocouple reference junction at 0° C. in which a water-ice reference environment is insulated from the effects of ambient temperature.

It is a still further object of this invention to provide structure integrally incorporating a thermocouple reference junction which structure will maintain the reference junction at a desired reference temperature.

In the practice of our invention, in a preferred embodiment thereof, we provide a thermocouple reference junction and reference environment producing device as a pre-assembled unit comprising a sealed cup-like container having an upstanding neck portion, the container and neck portions being initially filled with water. A reference junction for a thermocouple is positioned within the container. The container is mounted upon a thermoelectric cooling unit which is operative to reduce the temperature within the container to convert a portion of the water therein to ice. The upstanding neck portion of the container is constructed as a flexible bellows, the upper extremity of which is positioned adjacent a switch. As the thermoelectric cooling unit removes heat from the water, and as a percentage of the water is converted to ice, the volume of the water-ice mixture within the container and upstanding neck increases and the flexible bellows portion of the neck is extended, thereby actuating the switch. The switch is coupled to the thermoelectric cooling unit in such fashion that actuation of the switch deactivates the cooling unit whereupon heat is allowed to flow back into the container melting a portion of the ice until the volume of the container and thus the length of the bellows decreases sufficiently to deactuate the switch. The foregoing process takes place at the constant equilibrium temperature of ice and water thus maintaining the reference thermocouple at a constant 0° C. Means are provided for accurately adjusting the position of the switch with respect to the bellows so that the position of the water-ice interface in the container may be accurately controlled.

These and other objects and the features of our invention will appear as the description proceeds with the aid of the accompanying drawings, in which:

FIG. 1 is a side view, partially in section, of a preferred embodiment of our invention; and FIG. 2 is a schematic diagram of the power supply for our device.

Referring now to FIG. 1 of the drawings for a more particular description of our invention in a preferred embodiment thereof, an open topped casing, indicated generally at 10, is shown having a substantially flat bottom 12. The casing 10 is constructed of a suitable heat transfer material in order that it may serve as a heat sink, as hereinafter described, and in the preferred embodiment is constructed of aluminum. The bottom 12 of the casing 10 is provided with a plurality of feet 14 to prevent damage to surfaces upon which the casing 10 may be placed and also to elevate the bottom 12 thereof from such surfaces to permit adequate flow of air across the under surface of the device.

Positioned within the casing 10 is a vertically movable carriage, indicated generally at 16. The carriage 16 is mounted for vertical movement on a pair of adjustment screws 18 which extend upwardly through the bottom 12. A tubular sleeve 36 is positioned about the lower portion of each adjustment screw 18, and a horizontal plate 20 is slidably engaged on the screws 18 with its undersurface resting on the sleeves 36. The plate 20 is provided to position and securely hold a thermoelectric cooler and reference junction container, hereinafter described. A nut 22 is provided on each adjustment screw 18, in screw-threaded engagement therewith; by changing the position of the nuts 22 the holding force exerted on the plate 20 can be varied.

A compressible rubber sleeve 24 is slidably positioned on each of the adjustment screws 18 resting at its bottom end on the nut 22. A pair of L-shaped brackets, indicated generally at 26, are also slidably engaged on the adjustment screws 18 respectively by providing a suitable aperture 28 in a horizontal leg 30 of each bracket 26. In assembled condition, the horizontal legs 30 rest on the upper ends of the compressible rubber sleeves 24, respectively.

Vertical adjustment of the brackets 26 with respect to the bottom 12 of the casing 10 is accomplished by securing an interiorly screw threaded nut 32 to the horizontal legs 30 of the brackets 26, respectively. The nuts 32 are secured to the brackets 26 in any suitable fashion, and in the preferred embodiment a locking element 31 is provided slidably engaged on the adjustment screw 18 and having a first tab 33 which may be crimped over the nut 32 and a second tab 35 which may be crimped under the bracket 26. The nuts 32 are positioned in axial alignment with the apertures 28 in the brackets 26, the compressible sleeves 24 and the apertures in the horizontal bottom plate 20. The interior screw threads of the nuts 32 are in cooperating engagement with exterior screw threads 34 provided along a substantial upper portion of the adjustment screws 18. It will thus be noted that by rotation of the adjustment screws 18, the brackets 26 may be caused to move vertically with respect to the bottom 12.

The brackets 26 are each provided with an upstanding vertical leg 38. The legs 38 are initially positioned in opposed parallel relationship and are rigidly joined together by a switch housing 40 as will be hereinafter described. The legs 38 and switch housing 40 are securely joined together by means of a bolt 41. It will be noted that the carriage 16 is dimensioned such that the switch housing 40 will be movable vertically along the vertical centerline of the casing 10.

Positioned directly below the switch housing 40 at the vertical centerline of the casing 10 is a thermoelectric cooling unit indicated generally at 42, employing the well-known Peltier effect. The thermoelectric cooler 42, hereinafter referred to as the Peltier cooler 42, is mounted directly on the upper surface of the horizontal bottom 12.

The Peltier cooler 42 in the preferred embodiment is of semi-conductor construction having a p-type and an n-type element which, as usual, provide a hot junction 44 and a cold junction 46. A source of direct potential is provided for the operation of the Peltier cooler 42, as represented in the circuit diagram of FIG. 2. The power circuit of FIG. 2 comprises a step-down transformer 43, a pair of silicon diodes 45 acting as rectifiers and a suitable choke filter 47 whereby a continuous D.C. potential is provided for the Peltier cooler 42 at an output terminal indicated at 49. Line current is fed to the transformer 43, through a switch hereinafter to be described and here indicated diagrammatically at 51. The power circuit illustrated in FIG. 2 also shows fuse means 53, an external power switch 55 and a neon pilot lamp sub-circuit indicated generally at 57.

As stated above, the Peltier cooler 42 is mounted directly on the bottom 12 and its hot junction 44 is in direct contact therewith. It will be noted that the casing 10 not only serves the function of providing a suitable container within which the several components of the device may be assembled, but also serves the necessary function of providing a suitable heat sink for the dissipation of the heat produced at the hot junction 44 of the Peltier cooler 42. For this reason, and to provide electrical insulation, anodized aluminum is used in the fabrication of the casing 10 in the preferred embodiment, however, it will be understood that any other suitable heat transfer material may be used.

The cold junction of the Peltier cooler 42 forms a horizontal plate 46. Mounted directly on the plate 46 is a bottom plate 48 of a reference junction container, indicated generally at 50. The container 50 is provided with upstanding side walls 52 which are sealed to the bottom plate 48 in a watertight fashion. The bottom plate 48 and container 50, in the preferred embodiment, are constructed of brass. A top plate 54 integrally formed with the side walls 52 is provided having at its center an opening defined by an upstanding annular flange 56. The transverse dimension of the annular flange 56 is substantially less than the transverse dimension of the container 50 as seen in FIG. 1 of the drawings.

A flexible bellows element 58 is mounted at the upper extremity of the annular flange 56 and is secured thereto in watertight engagement. The upper extremity of the bellows 58 is closed by a circular wear plate 60 which is secured thereto.

In order to fill the interior of the container 50 and the bellows 58 with a suitable fluid medium, in the preferred embodiment water, a fill tube 62 is provided which communicates with the interior of the container 50 through one of the side walls 52.

A thermocouple junction 64 is inserted through a second side wall 52 of the container 50 and extends a substantial distance into the container 50. It will be noted that the junction 64 is positioned parallel to the horizontal bottom 48 of the container 50. A suitable seal 66 is provided to prevent the contents of the container 50 from escaping at the point at which the thermocouple junction 64 passes through the side wall 52. In the preferred embodiment of FIG. 1, the thermocouple junction 64 is shown as permanently installed in the container 50. In this embodiment it is contemplated that a thermocouple circuit having the same characteristics as the junction 64 will be connected to the junction 64 in operation. It should be noted, however, that the junction 64 may be removable whereby the reference junction of any desired thermocouple circuit could be inserted in the container 50. It should further be noted that in the preferred embodiment only one thermocouple junction 64 is shown in the container 50. It will, however, be appreciated that a plurality of such thermocouple junctions 64 could be positioned similarly in the container 50.

It will be noted that an aperture, indicated generally at 68, is formed in the horizontal plate 20 coaxial with the bellows element 58 and the annular flange 56 on the container 50 to permit the bellows 58 to extend upwardly through the plate 20.

A switch 40 having an actuating button 72 is mounted between the brackets 26, as above described, in depending relationship thereto. The actuating button 72 is initially positioned in vertical alignment with the end plate 60 on the bellows element 58.

In order to provide protection and thermal insulation for the bellows 58 and further to prevent the accumulation of any condensate on the exterior surfaces thereof, a rigid sleeve 76 is secured to the aperture 68 in the plate 20 at its base. A protective rubber sleeve 78 is secured to the switch 40 and is mounted surrounding the rigid sleeve 76 in sliding engagement. An annular seal 80 of compressible construction is mounted coaxially with the annular flange 56 on the top 54 of the container 50 and is of slightly larger radius than the aperture 68 provided through the plate 20. It will thus be noted that when the under surface of plate 20 is in contact with the annular seal 80 the exterior of the bellows element 58 is insulated from conditions otherwise prevailing in the casing 10.

The container 50 having been filled with a fluid medium, the interior of the casing 10 is partially filled with an insulating material 82, as for example, a polyurethane foam having a closed cellular structure. Prior to final adjustment the remaining portion of the casing 10 is filled with a flexible foam 84.

The preparation, adjustment and operation of the device is as follows:

With the several components in assembled condition, but prior to the addition of the foams 82 and 84, the carriage 16 is raised sufficiently to disengage the actuating button 72 of the switch 40 from the end plate 60 on the bellows 58. The container 50 has been filled through the fill tube 62 at an earlier time with a fluid medium which will undergo a change of state accompanied by a change in volume at the desired reference temperature. In the preferred embodiment, the reference temperature is 0° C. and the fluid used is distilled demineralized water. When the container 50 and the interior of the bellows 58 are completely filled with water the fill tube 62 is pinched off to seal the water permanently within the container.

The thermocouple reference junction 64 is connected by suitable thermocouple wiring (not shown) to terminals 86 hereinafter described. The Peltier cooler 42 is connected by wiring (not shown) to suitable terminals 87. The switch 40 is wired into the power circuit of the Peltier cooler 42 in such fashion that pressure applied to the actuating button 72 will deactivate the power supply to the Peltier cooler 42 as shown in FIG. 2.

The nuts 32 are then rotated until the actuating button 72 of the switch 40 is in close proximity to the end plate 60 of the bellows 58. The insulating foam 82 is then foamed in place within the casing 10. The locking elements 31 are crimped to secure the nuts 32 to the legs 30 of the brackets 26 respectively and the flexible foam 34 is then foamed on top of the foam 82. A suitable cover plate 88 carrying the terminals 86 for the thermocouple reference junction 64 is secured to the casing 10 to close it from the atmosphere.

The thermocouple reference junction 64 is then connected through terminals 86 in a thermocouple circuit to a known reference junction which is maintained at 0° C. and the Peltier cooler is actuated.

Because the container 50 and bellows 58 are substantially insulated on all their external surfaces, except the external surface of the bottom 48 of the container 50 which is in direct communication with the cold junction 46 of the Peltier cooler 42, the cooling effect of the cooler 42 is directed almost entirely at the bottom of the container 50.

The Peltier cooler 42 is permitted to operate until no current flows in the thermocouple circuit indicating that the 0° C. water-ice interface within the container 50 has reached the level of the thermocouple junction 64. The adjustment screws 18 are then rotated to cause the brackets 26 to descend until the end plate 60 on the bellows 58 engages the actuating button 72 on the switch 40 to deactivate the power supply to the Peltier cooler 42.

When the power to the cooler 42 has been turned off, the ice contained within the container 50 will begin to melt. This will cause a total volumetric reduction within the container 50 and the bellows 58 causing the bellows 58 to contract. When the bellows 58 has contracted sufficiently, the end plate 60 thereon will exert less pressure on the actuating button 72 whereupon the power supply to the Peltier cooler 42 will again be actuated. Through continuous cycling of the cooler 42, a water-ice interface may be maintained at the level of the thermocouple reference junction 64 for an extended period of time. When the carriage 16 has been finally adjusted such that the thermocouple reference junction 64 is properly calibrated at 0° C., the thermocouple junction 64 may be disconnected from the known reference junction and the thermocouple junction 64 itself used as a known reference junction by attaching a thermocouple circuit containing a measuring thermocouple junction to the thermocouple terminals 86.

It will be noted that providing a neck portion on the container 50 having a relatively small lateral dimension into which the water which is displaced by the ice can move results in an hydraulic displacement multiplication, decreasing the amount of ice which must be formed or melted to activate or deactivate the switch. It will also be noted that the situation of the thermoelectric cooling unit at the outside and at the bottom of the container 50 and the further insulation of the entire structure provides substantially only one path for heat flow out of the container, namely, through the bottom 48 thereof, thereby controlling the formation of ice in a manner suited for maximum accuracy. The situation of the cooling unit at the exterior of the container is further highly desirable to properly insulate the thermocouple junction from the electrical field of the cooling junction. The use of a hermetically sealed structure employing a metal bellows further eliminates problems of liquid leakage or contamination.

It will also be noted that the thermocouple junction inside the container is oriented parallel to the water-ice interface and extends for some distance within the container thereby minimizing inaccuracies caused by heat conduction along the length of the thermocouple. By providing a vertical adjustment for the switch, it is possible to control the water-ice interface, as described, to position it at the thermocouple junction. In practice, it has been discovered that the water-ice interface position can be controlled to such a degree that it is possible to produce a reference temperature which is consistently accurate in excess of 0.1° F.

It should further be noted that whereas the switch 40 disclosed herein is of the on-off, snap switch type, it is obvious that a continuous control switch might be substituted therefor, whereby continuous operation of the Peltier cooler would be provided.

Having thus described and illustrated a preferred embodiment of our invention, it is our intention to claim all changes and modifications of the example of the invention within the spirit and scope of the appended claims.

What we claim as new and desire to secure by Letters Patent of the United States is:

1. Means for producing a thermocouple junction reference environment, said means comprising, in combination, a container, a flexible wall on said container; a fluid medium within said container having a change of state temperature equal to the desired reference temperature; means on a wall of said container other than said flexible wall for receiving a thermocouple junction to be disposed within said container; thermoelectric means positioned at the exterior of said container and in thermal communication with the interior thereof for removing heat from said fluid medium contained within said container, and means actuated by the movement of said flexible wall for controlling said thermoelectric means for removing heat from within said container when the desired reference temperature has been established.

2. Means for producing a thermocouple junction reference environment, said means comprising, in combination, a container, a top wall on said container, an upstanding flange on said top wall of said container defining an opening therethrough, said flange having a transverse dimension substantially less than the transverse dimension of said container, a flexible wall on said upstanding flange closing said opening into said container, a fluid medium within said container having a change of state temperature equal to the desired reference temperature, means on a wall of said container other than said flexible wall for receiving a thermocouple junction to be disposed within said container, means positioned at the exterior of said container for removing heat from said fluid medium contained within said container, means including thermal insulation whereby substantially only one path is provided for heat transfer out of said container, and means actuated by the movement of said flexible wall for controlling said means for removing heat from within said container.

3. Means for producing a reference environment for a thermocouple junction comprising, in combination, a container; a top wall on said container; an upstanding annular flange located on said top wall of said container defining an opening through said top wall into said container; a flexible wall secured to and closing said annular flange at the upper periphery thereof; means for introducing a fluid medium having a change of state temperature equal to the desired reference temperature into said container; a thermoelectric cooling unit positioned at the exterior of said container and having its cold junction in direct contact therewith; means for controlling the power supplied to said thermoelectric cooling unit; adjustable carriage means mounting said means for controlling said power in alignment with said flexible wall, whereby deflection of said flexible wall will operate said means for controlling said power to said thermoelectric cooling unit; means for insulating said container to provide substantially only one heat transfer path into and out of said container through the portion of said container in direct contact with said cold junction of said thermoelectric cooling unit; and means including a seal for mounting at least one thermocouple junction within said container.

4. Means for producing a reference environment for a thermocouple junction comprising, in combination, a container; a top wall on said container; an upstanding annular flange located on said top wall of said container defining an opening through said top wall into said container; a bellows element secured to said annular flange at the upper periphery thereof; a fill tube in communication with said container whereby a fluid medium having a change of state temperature equal to the desired reference temperature may be introduced into said container and said bellows; a thermoelectric cooling unit positioned at the exterior of said container and having its cold junction in direct contact therewith; a switch; adjustable carriage means mounting said switch in alignment with an end portion of said bellows; said switch being operatively connected in the power circuit of said thermoelectric cooler to break the said power circuit when said switch is actuated; and means including a seal for mounting a thermocouple junction within said container; whereby when said thermoelectric cooling unit is actuated said fluid medium in said container will be cooled to its change of state temperature and the resulting volumetric change in the contents of the said container and said bellows will cause said bellows to change length to actuate said switch thereby deactuating said thermoelectric cooling unit.

5. A thermocouple reference junction comprising, in combination, a container; a top wall on said container; an upstanding flange on said top wall of said container defining an opening through said top wall into said container, said flange having a transverse dimension substantially less than said transverse dimension of said container; a bellows element secured to said annular flange at the upper periphery thereof; a fluid medium having a change of state temperature equal to the desired reference temperature contained within said container and said bellows; a Peltier cooling unit positioned at the exterior of said container and having its cold junction in direct contact therewith; switch means for controlling said Peltier cooler; adjustable carriage means mounting said switch means in alignment with an end portion of said bellows; a thermocouple junction; means including a seal for mounting said thermocouple junction within said container; and thermal insulating means to provide heat transfer out of said container only at the portion thereof at which said cold junction of said Peltier cooling unit is in direct contact.

6. A thermocouple reference junction comprising, in combination, a container; a top wall on said container; an upstanding annular flange located on said top wall and defining an opening through said wall into said container; a bellows element secured to said annular flange at the upper periphery thereof; a fill tube in communication with said container whereby a fluid medium having a change of state temperature equal to the desired reference temperature may be introduced into said container and said bellows; a Peltier cooler positioned beneath said container and having its cold junction in direct contact therewith; an exterior casing, said Peltier cooler having its hot junction in direct contact with said exterior casing; a switch; adjustable carriage means mounted on said exterior casing to position said switch in vertical alignment with an end portion of said bellows, said switch being operatively connected in the power circuit of said Peltier cooler to break the said power circuit when said switch is actuated; a thermocouple junction; means including a seal mounting said thermocouple junction within said container, whereby when said Peltier cooler is actuated, said fluid medium in said container will be cooled to its change of state temperature and the resulting volumetric change in the contents of the said container and said bellows will cause said bellows to change length to actuate said switch thereby deactuating said Peltier cooler; and means providing thermal insulation between said container and said exterior casing.

7. A thermocouple reference junction as defined in claim 6 further characterized by said fluid medium consisting of water.

8. A thermocouple reference junction comprising, in combination, an exterior casing; a flat bottom on said casing; a Peltier cooler mounted in said casing with its hot junction in direct contact with said flat bottom thereof; a flat plate formed by the cold junction of said Peltier cooler; a container having its bottom mounted directly on said flat plate; a top on said container; a wall in the form of an upstanding annular flange on said top of said container defining a passage through said top into said container; a tubular bellows element of substantially less lateral dimension than said top of said container secured to said upstanding annular flange; a wear plate closing said tubular bellows element at its upper extremity; a fill tube positioned through a wall of said container whereby a fluid medium having a state change of state temperature equal to the desired reference temperature may be admitted into said container and said tubular bellows; at least one thermocouple junction; means including a seal mounting said at least one thermocouple junction through a wall of said container; a pair of adjustment screws positioned through said flat bottom of said exterior casing substantially normal thereto; a carriage carried by said pair of adjustment screws; a switch carried by said carriage and initially positioned in spaced aligned relation with said wear plate closing said upper extremity of said bellows element; a flexible insulating sleeve mounted to said switch and coaxial therewith; a rigid sleeve mounted at its lower end to said carriage, said insulating sleeve and said rigid sleeve being each initially positioned coaxial with and surrounding said bellows element; means for supplying a continuous D.C. potential to said Peltier cooler, said means being deactuated by actuation of said switch; and thermal insulating means including a foam having a closed cellular structure foamed and cured in place within said exterior casing.

References Cited in the file of this patent

UNITED STATES PATENTS

| 2,952,724 | Fritts | Sept. 13, 1960 |
| 2,986,890 | Bevans | June 6, 1961 |